United States Patent [19]

Hueber

[11] Patent Number: 5,147,425
[45] Date of Patent: Sep. 15, 1992

[54] DRIVING AND SUPPLY UNIT FOR A COOLER

[75] Inventor: Joseph Hueber, Gruningen, Switzerland

[73] Assignee: Sulzer Brothers Limited, Winterthur, Switzerland

[21] Appl. No.: 673,275

[22] Filed: Mar. 21, 1991

[30] Foreign Application Priority Data

Apr. 4, 1990 [CH] Switzerland ............. 01134/90

[51] Int. Cl.$^5$ ............................. B01D 47/00
[52] U.S. Cl. ............................. 55/230; 261/25; 415/81; 55/467
[58] Field of Search .................. 55/467, 230, 233; 261/25; 415/81

[56] References Cited

U.S. PATENT DOCUMENTS 2,217,130 10/1940 Niehart ..................... 261/9

FOREIGN PATENT DOCUMENTS 0289340 12/1915 Fed. Rep. of Germany.
294685 10/1916 Fed. Rep. of Germany ........ 261/25

Primary Examiner—Bernard Nozick
Attorney, Agent, or Firm—Kenyon & Kenyon

[57] ABSTRACT

A driving and supply unit is provided with an air channel for drawing in hot air and delivering the air via a fan to a spray cooler with spray nozzles for spraying droplets of water into the conveyed air for cooling the air. Cooling water is delivered via a high-pressure water pipe and is first fed via a control to an impulse turbine with a reduction gear for driving the fan. The water is collected downstream of the turbine and is fed via a water pipe to the spray nozzles of the cooler.

13 Claims, 6 Drawing Sheets

DRIVING AND SUPPLY UNIT FOR A COOLER

This invention relates to a driving and supply unit for a cooler such as a spray cooler or surface cooler. More particularly, this invention relates to a driving and supply unit for a cooler used at deep levels.

Spray coolers and surface coolers are employed in large numbers in mining in order to generate cooling air at deep levels. In an article "Optimierung der Kalteubertragung beim Klimatisieren tiefer Steinkohlenbergwerke" [Achieving an optimum in the transfer of cooling in the air-conditioning of deep hard-coal mines] in January 1987 by Prof. Dr.-Ing. E.-U. Reuter of the Institut fur Bergbaukunde [=Science of mining] I of the Rheinisch-Westfalichen Technischen Hochschule Aachen for the Deutsche Forschungsgemeinschaft [=German Research Association] for the DFG file number Re 194/15-1, the conditions of use for spray and surface coolers in hard-coal mining are described and compared.

A further article "Optimisation of spray coolers for cooling deep coal mines" by the authors H. E. Reuther, H. Uhlig and G. Hagen was presented at the: Fourth International Mine Ventilation Congress, published by the Australian Institute of Mining and Metallurgy in Melbourne, printed by Brown prior Anderson Pty Ltd., 5 Evans Street, Burwood, Victoria, Australia 3125, describes on page 453 MESH COOLERS for the mines in South Africa and shows standardized spray coolers which may be connected to a flow of hot air for cooling the air.

At great depths, it no longer pays to bring cooled air from the surface into the hot workings as a cooling medium since the heating along the way is too great. In such cases, cold water is provided as the cooling medium, which is brought underground and arrives at coolers through which the ventilation of a gallery is led. Due to its high specific heat, the cooling water is still at a low temperature upon arrival at the coolers which for the achievement of good heat transfer and satisfactory self-cleaning are usually made as spray coolers.

In deep levels, cooling air is usually needed at the face in order to keep machines, the ambient air and operating personnel cool. Circulation is effected by large fans which are electrically driven and their driving motors give out heat. Dependence thereby exists upon an electrical supply system which, in the case of heavy current, is regulated within strict limits and causes a considerable proportion of the investment and operational costs.

Various types of air coolers have also been known from German Patent 289,340 and U.S. Pat. No. 2,217,130. In the latter case, water is used to drive a turbine which, in turn, drives a fan for blowing air through a chamber. Water is also supplied through multiple water spray devices located in the throat of a Venturi construction through which the fan directs air for cooling purposes. The described structure is such that all of the elements are confined within the Venturi construction of the spray draft unit.

Accordingly, it is an object of the invention to provide for the circulation and cooling of air at a number of lower levels with only one energy-carrier, namely cooled surface water.

It is another object of the invention to provide for the cooling of equipment and/or personnel at subterranean levels in an efficient manner.

It is another object of the invention to provide relatively simple apparatus for the cooling of equipment and personnel at subterranean depths.

It is another object of the invention to provide for the cooling of air at subterranean depths without the use of electrical lines.

Briefly, the invention provides a driving and supply unit for a cooler which comprises an air channel, a fan disposed in the air channel for driving a flow of air through the channel and an impulse turbine having a rotatable wheel and a gear transmission connected between the wheel and the fan for driving the fan in response to rotation of the wheel. In addition, a cooling water supply means having a high pressure nozzle is provided for directing a pressurized flow of water onto the wheel for rotating the wheel and, thus, for supplying energy for driving the fan.

Still further, a collector is provided for collecting water downstream of the wheel along with a delivery pipe which extends from the collector for conveying the collected water to a cooling water main connected to the delivery pipe for delivering the water to a cooler in the air channel. This cooling water main may be connected to a spray cooler having a plurality of spray nozzles or the cooling water main may be connected to a surface cooler.

One of the advantages of the driving and supply unit is that no electrical power is required at the unit for cooling and circulating the air, for example, for use as ventilating air.

A housing may be provided to house the air channel, fan, impulse turbine and collector while a separate cooler is provided to effect the cooling of the air. In this respect, the delivery pipe is able to communicate the collector in the housing with the cooler while a flexible pipe is used to communicate the air channel in the housing with an air duct in the cooler for delivering air thereto. Further, the housing and cooler may be kept mobile within the compass of high-pressure water connections and flexible high-pressure piping.

The construction of the driving and supply unit and cooler is relatively simple. Hence, mechanically trained personnel should be sufficient for the maintenance and servicing of the driving and supply unit and cooler.

These and other objects and advantages of the invention will become more apparent from the following detailed description taken in conjunction with the accompanying drawings wherein:

FIG. 1 diagrammatically illustrates a driving and supply unit connected with a cooler in accordance with the invention;

Figure 1:
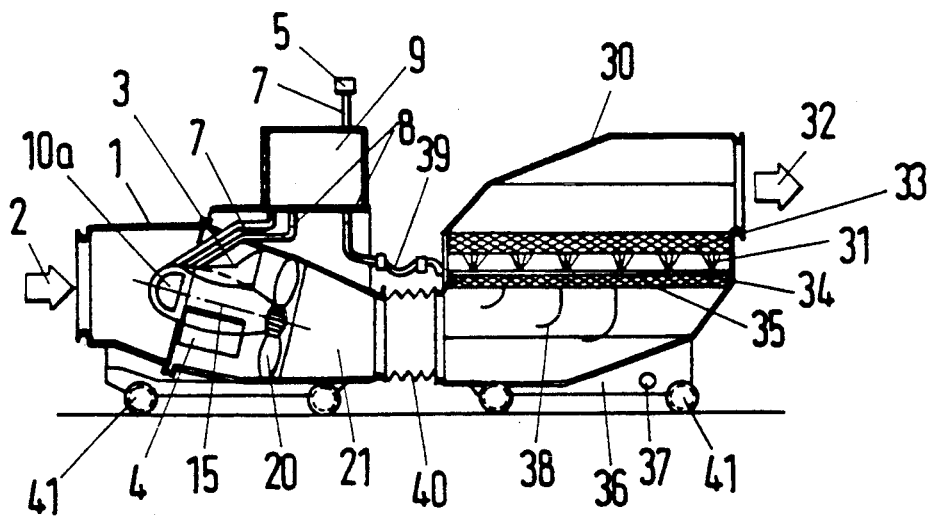

Referring to FIGS. 3-7, the hydraulic symbols for shut-off valves are designated by reference character 6, for adjustable pressure-limiting valves by reference character 45, for pressure gauges by reference character 46, for hand-controlled operating valves by reference character 48, for non-returned valves by reference character 49 and for the direction of rotation of shafts by reference character 53.

Referring to FIG. 1, the driving and supply unit 1 is constructed for connection with a cooler such as a spray cooler 30 such as are employed in underground mining.

As illustrated in FIG. 1, the driving and supply unit 1 has a housing for receiving a flow 2 of air, such as hot air which may exist at a subterranean site. In addition, the housing encases an air channel 21 which, in turn, contains a hollow section 3 which is supported in the air channel 21 by means of struts 4.

In addition, a cooling water supply means is provided in the unit 1 and includes a high-pressure coupling 5 secured to a flexible high-pressure water pipe 7 for the delivery of high pressure water. As indicated, the water pipe 7 extends through a control 9 which is provided with various indicating instruments, control and regulating devices as well as shut-off members for the hydraulics. In this way, the flow of water through the water pipe 7 can be controlled.

As indicated in FIG. 1, a fan 20 is disposed in the air channel 21 for driving a flow of air through the channel 21. In addition, an impulse turbine 10a is provided for driving the fan 20.

Figure 2:
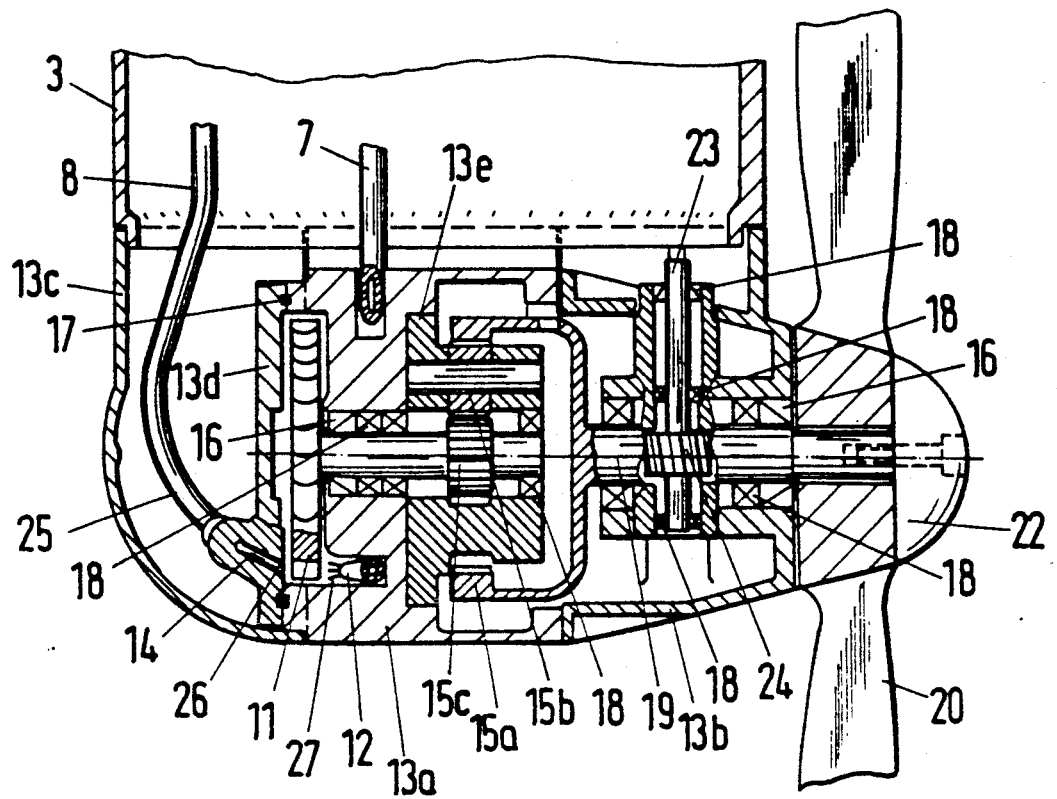
FIG. 2 illustrates a diagrammatic longitudinal sectional view through a turbine and fan arrangement of the driving and supply unit in accordance with the invention.

Referring to FIG. 2, wherein like reference characters indicate like parts as above, the impulse turbine 10a includes a rotatable wheel 11 and a gear transmission 15 connected between the wheel 11 and the fan 20 for driving the fan 20 in response to rotation of the wheel 11. In this respect, the wheel 11 is supported on an axial shaft and is mounted along with a reduction gear 15 and the fan 20 in a common housing formed of housing parts 13a, 13b, 13c, 13d. As indicated, this multi-piece housing 13a-d is supported from the hollow section 3.

The reduction gear 15 has three gear wheels 15a, 15b, 15c and is made as an epicyclic gear with a housing component 13e forming a planet-carrier. The internal gear wheel 15a is made as a bell which is connected to a shaft 19 on which the fan 20 is mounted and held in place by a cover piece 22.

Suitable soft dynamic seals 16 and soft static seals 17 are provided throughout in order to prevent an escape of water from the turbine housing 13a-d. Likewise, suitable bearings 18 are provided throughout to rotatably support the various shafts and gear wheels. In addition, an auxiliary shaft 23 is rotatably supported by bearings 18 in transverse relationship to the fan shaft 19 and carries a worm wheel 24 which engages in a portion of the fan shaft 19 which is formed as a worm. Thus, rotation of the fan shaft 19 serves to rotate the auxiliary shaft 23.

As shown in FIG. 2, the high-pressure water pipe 7 of the cooling water supply means extends about the turbine housing and terminates in a high-pressure nozzle 12 which serves to direct a pressurized flow of water in the form of a jet 27 onto the wheel 11 for rotating the wheel 11. This driving jet 27 is deflected in the turbine wheel 11 and is subsequently fed to a collector 26 disposed within the housing component 13d opposite the nozzle 12. The collector 26, in turn, has a collector nozzle 14 for collecting the water as well as a diffuser 25 which extends from the collector nozzle 14 to a delivery pipe (water main) 8 for conveying the collected water away from the turbine 10a.

As indicated in FIG. 1, the delivery pipe 8 extends from the turbine 10a to the control 9 and, thence, from the control 9 to a connecting hose 39 for delivery to the cooler 30. In this respect, the control 9 serves to control the flow of water through the delivery pipe 8 to the cooler 30.

Referring to FIG. 2, connecting leads to the control 9 are led through the hollow section 3.

Further, the turbine housing has a vent to atmosphere so that reduced pressure does not arise through air being carried along in the collector nozzle 14. The zone of actuation for the turbine wheel 11 is so orientated that the collector 26 lies near the lowest point of the housing in order to suction away any remaining or residual water.

Referring to FIG. 1, the cooler 30 is constructed as a spray cooler. To this end, the cooler 30 has an air duct through which air may flow for cooling purposes. As illustrated, the spray cooler 30 has a wire grid 35 disposed across the air duct as well as deflector plates 38 for deflecting an incoming flow of air upwardly through the wire grid 35. A plurality of cooling water pipes 34 are disposed at the back of the grid to form a water main and are connected to the connecting hose 39 to receive the cooling water. In addition, the pipes 34 are provided with a plurality of spray nozzles 31 which serves to mix water droplets into the vertically upwardly directed air flow in order, by gravity, to achieve the longest possible dwell time for the heat exchange to occur in the ventilation air. A second succeeding wire grid 33 is disposed above the first wire grid 35 and spray nozzles 31 to act as a droplet precipitator. In this regard, water which precipitates within the grid 33 collects in a sump 36 located at a lower end of the cooler 30 and is led away by a water outlet 37. The air which has been cooled exits from the cooler in the direction indicated by the arrow 32.

As indicated, the air duct of the cooler 30 is connected to the air channel of the driving and supply unit 1 by means of a flexible pipe 40 in order to receive the flow of air.

During the operation, hot air is drawn into the driving and supply unit 1 in the direction indicated by the arrow 2. This air is then driven by the fan 20 which, in turn, is driven by a flow of cooling water via the high-pressure water pipe 7 and nozzle 12. The air is then conveyed into the cooler 30 via the flexible duct 40 and passed upwardly through the wire grids 35, 33 with heat being extracted from the air so as to be delivered as cold air from the exit of the cooler 30 in the direction indicated by the arrow 32. In the case of the spray cooler, the transfer of heat is effected from the air to the water droplets which are mixed into the flow of air from time-to-time from the spray nozzles 31. Depending upon the humidity of the air, these droplets evaporate slightly.

The control 9 serves to proportion the flow of cooling water so that pressure differences of about 1.5 bar at the spray nozzles 31 have to be overcome in case of the spray cooler 30.

In the case of a surface cooler (not shown), the transfer of heat takes place through partition walls from the ventilating air flow to the cooling water.

During operation, the driving and supply unit 1 is also fed with cooled high-pressure water through the high-pressure pipes 7 for driving of the impulse turbine 10a. The speed of rotation of this turbine 10a is reduced by the reduction gear 15 in order to drive the fan 20 and, optionally, further units via the auxiliary shaft 26 and a coupling (not shown). At the outlet from the impulse turbine 10a, the collector 26 collects the driving liquid 27 issuing from the nozzle 12 and feeds the water to the delivery pipe 8 for passage to the cooling water main 34 of the spray cooler 30.

As indicated in FIGS. 1 and 2, the housing of the driving and supply unit 1 and the cooler 30 is provided with a plurality of wheels or trolleys 41 on the bottom for movement of each as a unit.

In the case of an axial turbine 10a, the residual kinetic energy of the driving jet 27 beyond the turbine wheel 11 may be recovered as pressure energy by the collector nozzle 14 and the diffusor 25. In this regard, the nozzle 14 is connected to a kidney-shaped opening of the collector 26 and narrows in the form of a slit to the diffusor 25. This recovered pressure is adequate for generating the drop in pressure needed for the spray nozzles 31.

Besides the choice of the type of impulse turbine for a supply unit 1, the adjustment of the amounts of water plays a great part, that is, in the case of a certain drop in pressure across the turbine, the amount of water needed for the driving power will only, in a few cases, coincide with the amount of water needed for the cooling capacity. Thus, the comparison in the case of different drops in pressure and a heating of the water by 15° C. in the spray cooler and the same data for the air passing through, shows that, in the case of a pressure drop of 400 meters (m), an amount of water is necessary for driving the fan, which corresponds with the amount of water for the spray cooler. In the case of a pressure drop of 2000 meters (m), only one fifth of the amount of water needed for the spray cooler can be employed for driving the fan.

As a consequence of this dependence, for mining at levels of greater depth, it is proposed either to utilize the geodetic drop in cascades for turbine-driven working-machines and in order to satisfy the example, to employ the last stage with 400 meters (m) pressure drop for operating driving and supply units 1 for spray or surface coolers or to feed into the cooler, in addition, cooling or industrial water which occurs at low pressures at the level.

Figure 3:
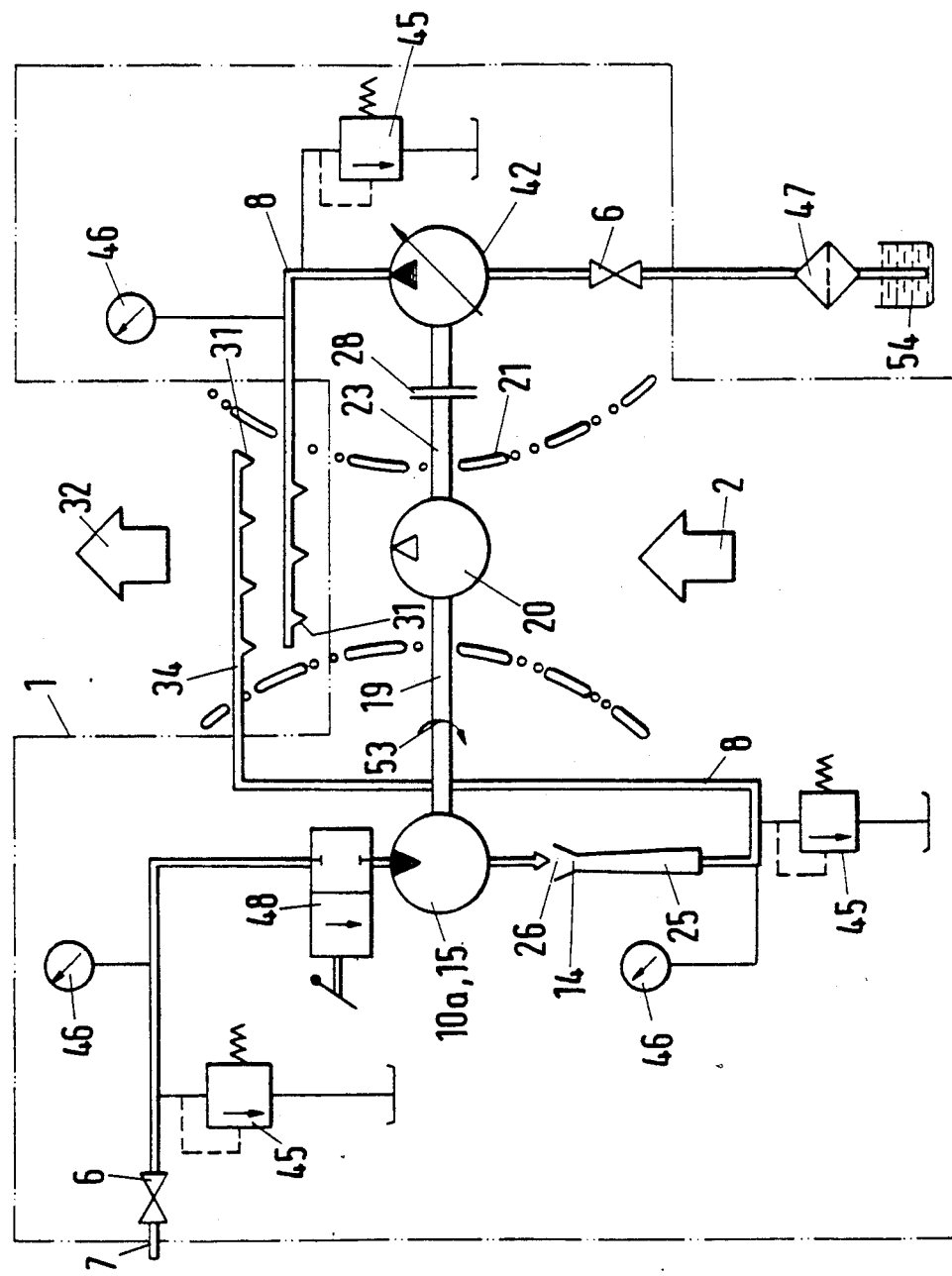
FIG. 3 illustrates a hydraulic diagram of a modified driving and supply unit having an axial turbine and a spray cooler in accordance with the invention.

Referring to FIG. 3, wherein like reference characters indicate like parts as above, this additional cooling water is delivered from a tank 54 via a suction filter 47 and shut-off valve 6 by an adjustable pump 42 which is driven in addition via the auxiliary shaft 23 and a coupling 28 thereon from the axial turbine 10a of the driving and supply unit 1.

Figure 4:
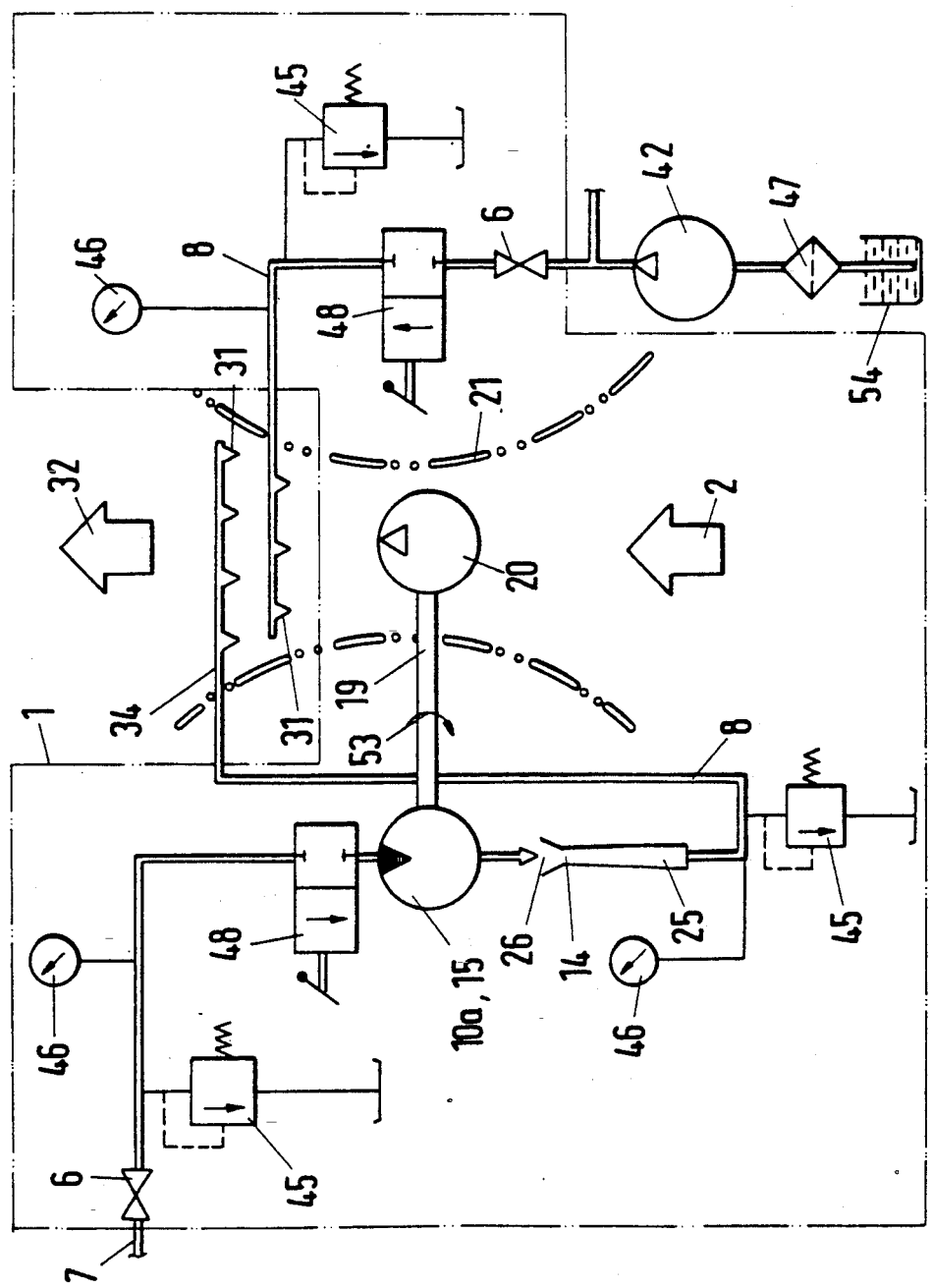
FIG. 4 illustrates a hydraulic diagram of a further modified driving and supply unit having a second network for independently supplying cooling water.

Referring to FIG. 4, wherein like reference characters indicate like parts as above, the additional cooling water may be fed independently of the axial turbine through a second network. That is, additional cooling water is fed in through an external low-pressure network having a tank 54 which may also lie at a higher level in order to save the pump 42. As indicated, the pump 42 is not coupled to the gear transmission of the turbine 10a. As also indicated, the pump 42 which draws water from the tank 54 via a filter 47 directs water through a shut-off valve 6 and a manually operated valve 48 to a delivery line 8 which leads to the nozzles 31 of the spray cooler.

Figure 5:
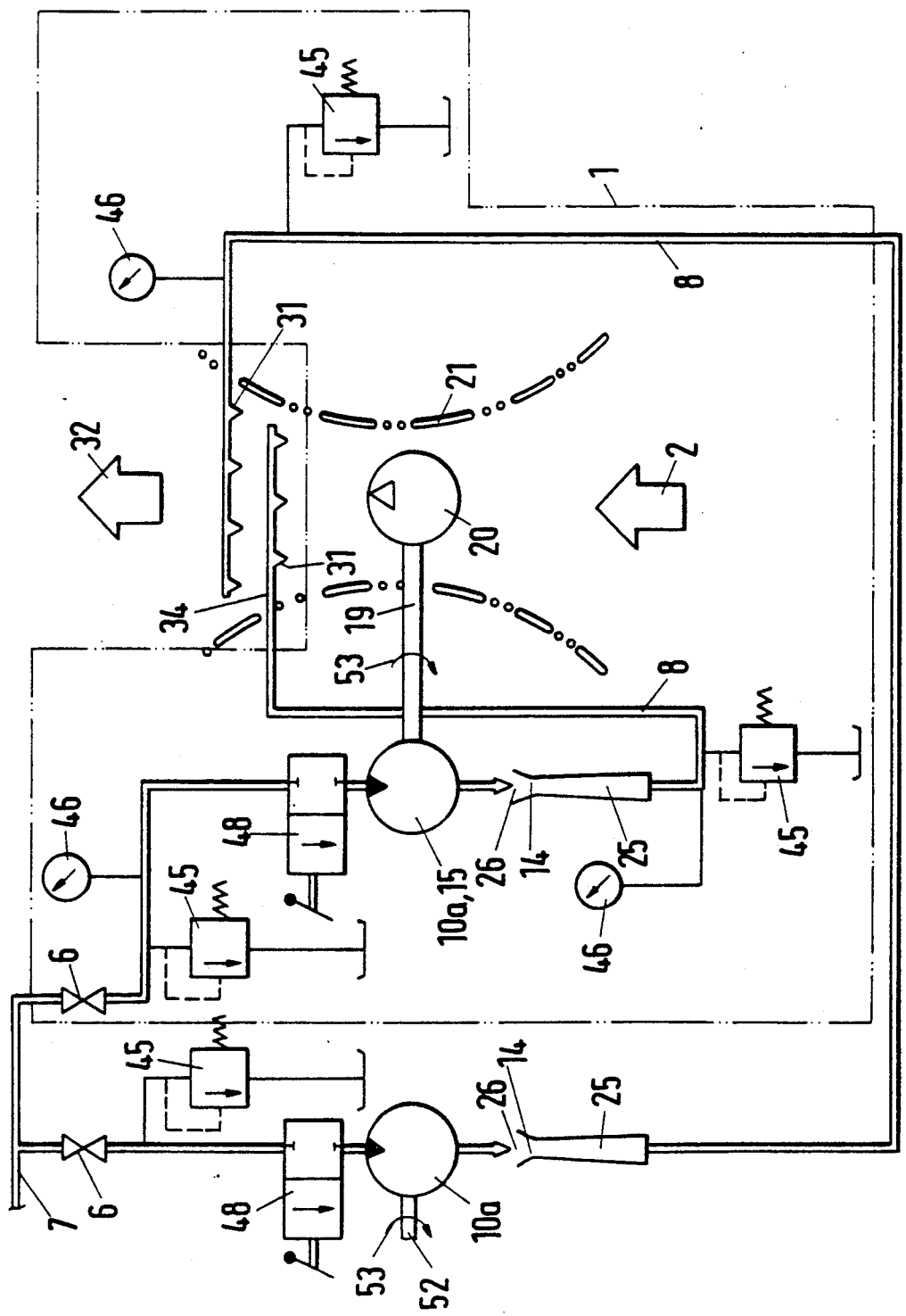
FIG. 5 illustrates a hydraulic diagram of a further modified driving and supply unit having an additional cooling water supply for a second axial turbine with succeeding pressure recovery.

Referring to FIG. 5, wherein like reference characters indicate like parts as above, the high-pressure water pipe 7 of the cooling water supply means may have a branch pipe which extends on the level of the driving and supply unit 1 via a shut-off valve 6 and manually operated valve 48 to a second axial turbine 10a which drives a shaft 52 in the direction of rotation 53 for driving a second working-machine (not shown). This second axial turbine 10a also directs a driving jet of water which is deflected from a turbine wheel (not shown) into a second collector 26 constructed as described above. The residual kinetic energy of the jet at the root of the nozzle 24 is partially recovered in the form of a rise in pressure in a diffusor 25. The cooling water which, up to this point, has only been heated insignificantly and is under pressure is likewise fed via a delivery pipe 8 to the spray cooler. Depending upon the length of the delivery pipe 8, a surge drum with a gas discharge is provided if the proportion of air carried along in the collector nozzle 14 has a troublesome effect upon the function of the cooler.

Figure 6:
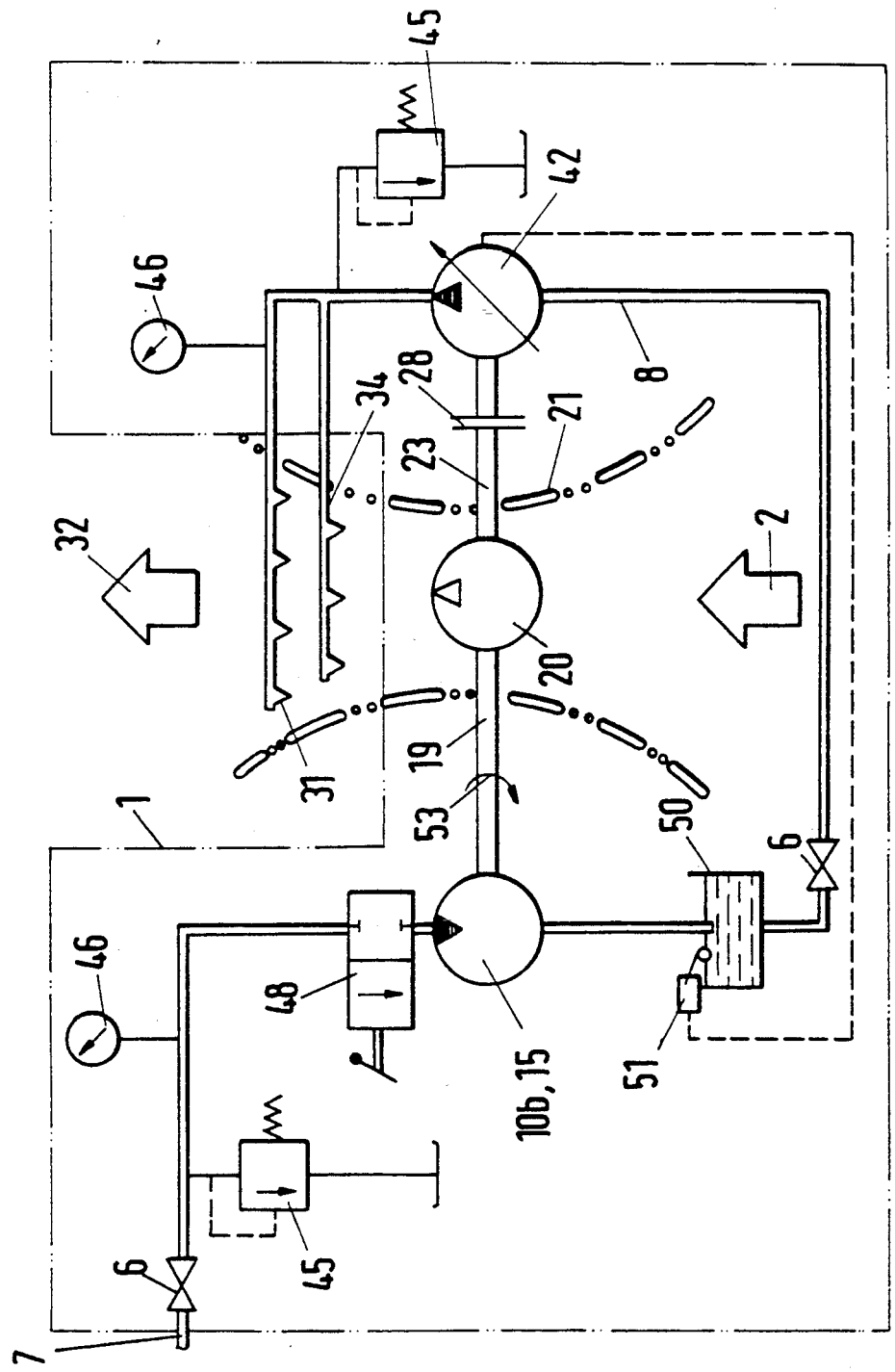
FIG. 6 illustrates a hydraulic diagram of a still further driving and supply unit with a Pelton turbine for driving a fan and a regulating pump via a reduction gear.

Referring to FIG. 6, wherein like reference characters indicate like parts as above, the turbine may be in the form of a Pelton turbine 10b. In this case, scarcely any residual kinetic energy can be gained from the water flowing away. By including the fan action of the turbine wheel in the case of a vented turbine housing, the water flowing away arrives in a collecting basin 50, the level of which is kept constant by means of a level regulator 51 by the delivery from the pump 42 driven by the Pelton turbine 10b being regulated in dependence upon the level. That is, the pump 42 is actuated in dependence upon signals from the level regulator 51 so as to maintain a constant level in the basin 50 while at the same time providing for a delivery of water to the spray nozzles 31.

Figure 7:
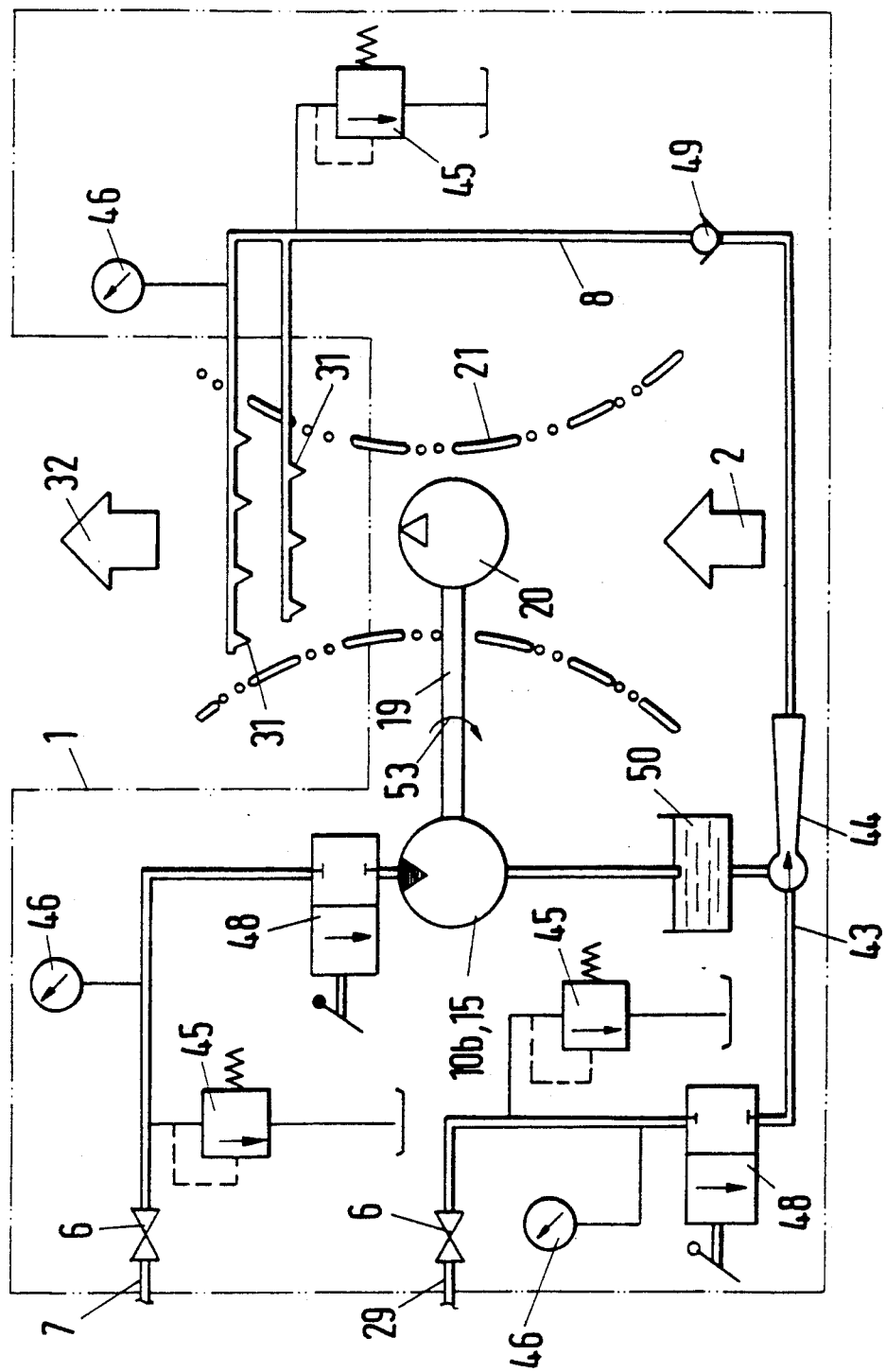
FIG. 7 illustrates a hydraulic diagram similar to FIG. 6 with a water jet pump fed from a second pressure network in accordance with the invention.

Referring to FIG. 7, wherein like reference characters indicate like parts as above, an external cooling water network with a pressure water main 29 is provided to supply enough pressure for a water jet pump 44 so as to be able to operate and for there to be a pressure in the delivery pipe 8 at the outlet from the water jet pump 44 in order to enable the use of the spray nozzles 31. As indicated, the water discharge from the turbine 10b is delivered to a basin 50, as above, and is thereafter supplied to the water jet pump 44 which is located in the delivery pipe 8 for conveying the collected water therethrough. The second water supply means has a pipe 43 extending from the pressure water main 29 via the manually operated valve 48 so as to supply a power jet to the jet pump 44 for feeding of the conveyed water from the basin 50 to the delivery pipe 8 and thus to the cooling water main of the spray cooler.

In the logic of overall planning for the energy carrier, it may happen in the case of small geodetic drops at levels of little depth that the amount of water required by the cooler is less than the amount of water required by the theoretical construction of the turbine. In that case, it is certainly logical to standardize the working turbines for a greater minimum drop and to use pumps at the surface to raise the pressure.

The invention thus provides a driving and supply unit for a cooler such as a spray or surface cooler which is a relatively simple construction.

Further, the invention provides a driving and supply unit as well as a cooler which can be readily employed underground and which can be constructed to be moved about in an easy manner.

Further, the invention provides for the circulation and cooling of air at a number of subterranean levels with only one energy-carrier, namely, cooled surface water.

What is claimed is:

1. A driving and supply unit for a cooler comprising:
an air channel;
a fan disposed in said air channel for driving a flow of air through said channel;
an impulse turbine having a rotatable wheel, said impulse turbine being an axial turbine, and a gear transmission connected between said wheel and said fan for driving said fan in response to rotation of said wheel;
a cooling water supply means having a high pressure nozzle for directing a pressurized flow of water onto said wheel for rotating said wheel;
a collector for collecting water downstream of said wheel;
a delivery pipe extending from said collector for conveying the collected water; and
a cooling water main connected to said delivery pipe for delivering the water to a cooler in said air channel, wherein said collector includes a collector nozzle for receiving a jet of water and a diffuser connected to and between said collector nozzle and said delivery pipe to throttle the velocity of the received jet of water for feeding to said water main under pressure.

2. A driving and supply unit as set forth in claim 1 which further comprises a housing enclosing said air channel, said fan and said turbine and wherein said collector nozzle has an inlet opening disposed near a lowest point of said housing for suctioning off residual water in said housing.

3. A driving and supply unit as set forth in claim 1 which further comprises a second impulse turbine, a second high pressure nozzle in said cooling water supply means for driving said second turbine, a second collector for collecting water downstream from said second turbine and a second delivery pipe extending from said second collector for conveying water to said cooling water main.

4. A driving and supply unit as set forth in claim 1 which further comprises a spray cooler having a plurality of spray nozzles connected to said cooling water main.

5. A driving and supply unit as set forth in claim 1 which further comprises a surface cooler connected to said cooling water main.

6. A driving and supply unit as set forth in claim 1 which further comprises a first spray cooler having a plurality of spray nozzles connected to said cooling water main, a sump for collecting water sprayed from said spray nozzles, a second spray cooler having spray nozzles between said air channel and said first spray cooler, and a pump for pumping water from said sump to said nozzles of said second spray cooler.

7. A driving and supply unit for a cooler comprising:
an air channel;
a fan disposed in said air channel for driving a flow of air through said channel;
an impulse turbine having a rotatable wheel, said impulse turbine being a Pelton turbine, and a gear transmission connected between aid wheel and said fan for driving said fan in response to rotation of said wheel;
a cooling water supply means having a high pressure nozzle for directing a pressurized flow of water onto said wheel for rotating said wheel;
a collector for collecting water downstream of said wheel;
a delivery pipe extending from said collector for conveying the collected water;
a cooling water main connected to said delivery pipe for delivering the water to a cooler in said air channel;
a water jet pump in said delivery pipe for conveying the collected water therethrough; and
a second cooling water supply means having a pipe extending to said jet pump for supplying a power jet thereto for feeding of the conveyed water to said cooling water main.

8. A driving and supply unit as set forth in claim 7 which further comprises a hydraulic pump in said delivery line for pumping the water to said cooling water main and wherein said gear transmission includes an auxiliary shaft connected to said pump for driving said pump.

9. A driving and supply unit as set forth in claim 7 which further comprises a surface cooler connected to said cooling water main.

10. A driving and supply unit as set forth in claim 7 which further comprises a spray cooler having a plurality of spray nozzles connected to said cooling water main.

11. A driving and supply unit as set forth in claim 7 which further comprises a first spray cooler having a plurality of spray nozzles connected to said cooling water main, a sump for collecting water sprayed from said spray nozzles, a second spray cooler having spray nozzles between said air channel and said first spray cooler, and a pump for pumping water from said sump to said nozzles of said second spray cooler.

12. In combination,
a housing having an air channel, a fan in said air channel for driving a flow of air through said channel, an impulse turbine having a rotatable wheel and a gear transmission connected between said wheel and said fan for driving said fan in response to rotation of said wheel
a cooling water supply means having a high pressure nozzle for directing a pressurized flow of water onto said wheel for rotating said wheel and a collector for collecting water downstream of said wheel;
a spray cooler having an air duct, a grid in said duct for passage of a flow of air therethrough and a plurality of spray nozzles for directing water onto said grid;
a delivery pipe communicating said collector in said housing with said nozzles of said cooler to deliver water to said nozzles; and
a flexible pipe communicating said air channel in said housing with said air duct in said cooler for delivering air thereto.

13. The combustion as set forth in claim 12 wherein each of said housing and said cooler includes a plurality of wheels on a bottom thereof for movement of each of said housing and cooler as a unit.

* * * * *